United States Patent
Brubaker

(10) Patent No.: US 6,186,793 B1
(45) Date of Patent: Feb. 13, 2001

(54) PROCESS TO CONVERT COST AND LOCATION OF A NUMBER OF ACTUAL CONTINGENT EVENTS WITHIN A REGION INTO A THREE DIMENSIONAL SURFACE OVER A MAP THAT PROVIDES FOR EVERY LOCATION WITHIN THE REGION ITS OWN ESTIMATE OF EXPECTED COST FOR FUTURE CONTINGENT EVENTS

(75) Inventor: Randall E. Brubaker, 230 Maple Rd., Barrington, IL (US) 60010

(73) Assignee: Randall E. Brubaker, Barrington, IL (US)

( * ) Notice: Under 35 U.S.C. 154(b), the term of this patent shall be extended for 0 days.

(21) Appl. No.: 08/970,964

(22) Filed: Nov. 14, 1997

Related U.S. Application Data

(63) Continuation of application No. 08/551,827, filed on Nov. 7, 1995, now abandoned.

(51) Int. Cl.[7] ............................. G09B 19/18; G06F 17/60

(52) U.S. Cl. ............................... 434/107; 705/4; 705/500

(58) Field of Search .......................... 434/107; 705/500, 705/4; 345/440

(56) References Cited

U.S. PATENT DOCUMENTS 5,897,619 * 4/1999 Hargrove, Jr. et al. .................. 705/4

OTHER PUBLICATIONS

Jones, David C., "GUS–Underwriting Workstation of the Future (Geographic Underwriting System", National Underwriter Property & Casualty–Risk & Benefits Management, n51, p22, Dec. 17, 1990.*

Covaleski, John M., "Software Helps Carriers Avoid Perilous Areas", Best's Review/ Property–Casualty Insurance Edition, vol. 94, Issue 10, pp 82–83, Feb. 1994.*

Musulin, Rade T., "Issues in the Regulatory Acceptance of Computer Modeling for Property Insurance", *Journal of Insurance Regulation,* vol. 15, No. 3, pp. 342–359, Spring 1997.*

"Risk Classification," Robert Finger, Foundations of Casualty Actuarial Science, pp. 231–276—1990.

Pamphlet re Vertical Mapper Software, Northwood Geoscience Ltd, publication date unknown.

"Generalized Additive Models," T.J. Hastie and R. J. Tibshirani, published in 1990 and reprinted 1991.

"A Geographic Information Analysis of Urban Infant Mortality Rates," Gerard Rushton, Diane Krishnamurtl, Rajesh Krishnamurthy and Hu Song, Jul. 1995.

"Using a Geographic Information System to Identify Territory Boundaries," Steven Christopherson and Debra L. Werland, published after Dec. 15, 1995.

M. Boskov and R.J. Verrall, *Premium Rating by Geographic Area Using Spatial Models,* ASTIN BULLETIN, 1994.

G.C. Taylor, *Use of Spline Functions for Premium Rating by Geographic Area,* ASTIN BULLETIN, 1989.

* cited by examiner

*Primary Examiner*—Jeffrey A. Smith
(74) *Attorney, Agent, or Firm*—Trexler, Bushnell, Giangiorgi & Blackstone, Ltd.

(57) ABSTRACT

A method of establishing the insurance rate at a desired location comprising the steps of selecting a plurality of predetermined points, calculating the insurance rate at each predetermined point, and interpolating among the values of insurance rates at predetermined points adjacent to the desired location to calculate the insurance rate at the desired location.

12 Claims, 8 Drawing Sheets

FIG.6a    CALCULATION OF BODILY INJURY PURE PREMIUM SURFACE
          FOR A GRID POINT
LONGITUDE = -122.439362, LATITUDE = 37.788797, RADIUS = 1.5 MILES, P=1.0

| | Longitude | Latitude | Distance from Grid Point | Distance Weight | Exposures at Grid Point | Total Weight | Total Weight Normalized | Unweighted Zip Code Pure Premium | Weighted Smoothed Pure Premium |
|---|---|---|---|---|---|---|---|---|---|
| | (1) | | (2) | (3) | (4) | (5) | (6) | (7) | (8) |
| GRID POINT | -122.439362 | 37.788797 | 0.000 | 1.0000 | 1958.00 | 1958.000 | 6.803% | 223.66 | 231.48 |
| | -122.461387 | 37.800391 | 1.443 | 0.4093 | 46.73 | 19.127 | 0.066% | 254.86 | |
| | -122.461378 | 37.794594 | 1.265 | 0.4415 | 46.73 | 20.631 | 0.072% | 254.86 | |
| | -122.461369 | 37.788797 | 1.200 | 0.4545 | 1353.09 | 614.979 | 2.137% | 248.31 | |
| | -122.461360 | 37.783000 | 1.264 | 0.4417 | 1353.09 | 597.660 | 2.077% | 248.31 | |
| | -122.461350 | 37.777203 | 1.441 | 0.4097 | 1353.09 | 554.361 | 1.926% | 248.31 | |
| | -122.454059 | 37.806188 | 1.443 | 0.4093 | 46.73 | 19.127 | 0.066% | 254.86 | |
| | -122.454051 | 37.800391 | 1.132 | 0.4690 | 46.73 | 21.916 | 0.076% | 254.86 | |
| | -122.454042 | 37.794594 | 0.895 | 0.5277 | 46.73 | 24.659 | 0.086% | 254.86 | |
| | -122.454033 | 37.788797 | 0.800 | 0.5558 | 1353.09 | 751.777 | 2.612% | 248.31 | |
| | -122.454025 | 37.783000 | 0.894 | 0.5280 | 1353.09 | 714.432 | 2.482% | 248.31 | |
| | -122.454016 | 37.777203 | 1.131 | 0.4693 | 1353.09 | 635.005 | 2.206% | 248.31 | |
| | -122.454007 | 37.771406 | 1.441 | 0.4097 | 799.81 | 327.682 | 1.138% | 280.85 | |
| | -122.446722 | 37.806188 | 1.265 | 0.4415 | 1505.71 | 664.771 | 2.310% | 236.44 | |
| | -122.446714 | 37.800391 | 0.895 | 0.5277 | 46.73 | 24.659 | 0.086% | 254.86 | |
| | -122.446706 | 37.794594 | 0.566 | 0.6386 | 46.73 | 29.842 | 0.104% | 254.86 | |
| | -122.446698 | 37.788797 | 0.400 | 0.7143 | 1353.09 | 966.512 | 3.358% | 248.31 | |
| | -122.446690 | 37.783000 | 0.565 | 0.6390 | 1353.09 | 864.625 | 3.004% | 248.31 | |
| | -122.446682 | 37.777203 | 0.894 | 0.5280 | 1353.09 | 714.432 | 2.482% | 248.31 | |
| | -122.446674 | 37.771406 | 1.265 | 0.4415 | 1319.13 | 582.396 | 2.023% | 202.04 | |
| | -122.439385 | 37.806188 | 1.200 | 0.4545 | 1505.71 | 684.345 | 2.378% | 236.44 | |
| | -122.439377 | 37.800391 | 0.800 | 0.5556 | 1505.71 | 836.572 | 2.907% | 236.44 | |
| | -122.439370 | 37.794594 | 0.400 | 0.7143 | 1505.71 | 1075.529 | 3.737% | 236.44 | |
| | -122.439355 | 37.783000 | 0.400 | 0.7143 | 1958.00 | 1398.599 | 4.859% | 223.66 | |
| | -122.439347 | 37.777203 | 0.800 | 0.5556 | 1319.13 | 732.909 | 2.546% | 202.04 | |
| | -122.439340 | 37.771406 | 1.200 | 0.4545 | 1319.13 | 599.545 | 2.083% | 202.04 | |
| | -122.432040 | 37.800391 | 0.894 | 0.5280 | 1505.71 | 795.015 | 2.762% | 236.44 | |
| | -122.432034 | 37.794594 | 0.565 | 0.6390 | 1958.00 | 1251.162 | 4.347% | 223.66 | |

FIG. 6b   CALCULATION OF BODILY INJURY PURE PREMIUM SURFACE FOR A GRID POINT

LONGITUDE = -122.439362, LATITUDE = 37.788797, RADIUS = 1.5 MILES, P=1.0

| Longitude | Latitude | Distance from Grid Point (2) | Distance Weight (3) | Exposures at Grid Point (4) | Total Weight (5) | Total Weight Normalized (6) | Unweighted Zip Code Pure Premium (7) | Weighted, Smoothed Pure Premium (8) |
|---|---|---|---|---|---|---|---|---|
| -122.432027 | 37.788797 | 0.400 | 0.7143 | 1958.00 | 1398.599 | 4.859% | 223.66 | |
| -122.432020 | 37.783000 | 0.566 | 0.6386 | 1958.00 | 1250.379 | 4.344% | 223.66 | |
| -122.432013 | 37.777203 | 0.895 | 0.5277 | 1319.13 | 696.105 | 2.419% | 202.04 | |
| -122.432006 | 37.771406 | 1.265 | 0.4415 | 1319.13 | 582.396 | 2.023% | 202.04 | |
| -122.424710 | 37.806188 | 1.442 | 0.4095 | 1505.71 | 616.588 | 2.142% | 236.44 | |
| -122.424704 | 37.800391 | 1.131 | 0.4693 | 1505.71 | 706.630 | 2.455% | 236.44 | |
| -122.424697 | 37.794594 | 0.894 | 0.5280 | 1825.67 | 963.954 | 3.349% | 223.65 | |
| -122.424691 | 37.788797 | 0.800 | 0.5556 | 1825.67 | 1014.342 | 3.524% | 223.65 | |
| -122.424685 | 37.783000 | 0.895 | 0.5277 | 1825.67 | 963.406 | 3.347% | 223.65 | |
| -122.424678 | 37.777203 | 1.132 | 0.4690 | 419.83 | 196.900 | 0.684% | 284.05 | |
| -122.424672 | 37.771406 | 1.443 | 0.4093 | 419.83 | 171.836 | 0.597% | 284.05 | |
| -122.417367 | 37.800391 | 1.442 | 0.4095 | 1825.67 | 747.612 | 2.597% | 223.65 | |
| -122.417361 | 37.794594 | 1.265 | 0.4415 | 1825.67 | 806.033 | 2.800% | 223.65 | |
| -122.417356 | 37.788797 | 1.200 | 0.4545 | 1825.67 | 829.767 | 2.883% | 223.65 | |
| -122.417350 | 37.783000 | 1.265 | 0.4415 | 419.83 | 185.355 | 0.644% | 284.05 | |
| -122.417344 | 37.777203 | 1.443 | 0.4093 | 419.83 | 171.836 | 0.597% | 284.05 | |

Notes (by column)

(1) Location of each data point
(2) See formula in text
(3) $[1/[(2)+1]]^P$, where P = 1.0
(5) (3) x (4)
(6) (5)/[Sum of (5)]
(7) 1991 California Department of Insurance BI Industry Pure Premiums
(8) Sum of [(6) x (7)]

PROCESS TO CONVERT COST AND LOCATION OF A NUMBER OF ACTUAL CONTINGENT EVENTS WITHIN A REGION INTO A THREE DIMENSIONAL SURFACE OVER A MAP THAT PROVIDES FOR EVERY LOCATION WITHIN THE REGION ITS OWN ESTIMATE OF EXPECTED COST FOR FUTURE CONTINGENT EVENTS

This application is continuation of U.S. patent application Ser. No. 08/551,827 filed Nov. 7, 1995 (now abandoned).

This invention is a process of establishing insurance rates. More particularly, it is a process of determining expected losses to be covered by insurance for specific geographic locations, and using that information to establish insurance rates for those specific geographic locations.

BACKGROUND OF THE INVENTION

Insurance companies must evaluate expected losses in determining the rates to be charged for insurance coverage to protect against those losses. Currently, expected losses for many types of insurance, such as casualty and property insurance, are determined by reference to a selected geographic territory. More specifically, a geographic territory is first defined or selected, and expected losses per insured risk are then calculated for that territory. The basic rate charged for insurance coverage, before individual risk factors other than location are considered, is the same for all specific locations within that geographic territory.

The current method does not reflect the fact that expected losses may vary significantly for different locations within a geographic territory. In addition, the rates charged for insurance coverage may vary dramatically from one geographic territory to the next. As a result, two neighbors who happen to live on opposite sides of a territorial boundary may be asked to pay very different insurance rates.

It is, therefore, an object of the invention to provide a more accurate method of evaluating expected losses at given geographic locations for the purpose of establishing insurance rates for those locations.

It is a further object of the invention to eliminate dramatic differences between the insurance rates charged at adjacent or nearby locations.

SUMMARY OF THE INVENTION

These objects and others are achieved according to the present invention by an insurance rating process comprising the steps of selecting a plurality of predetermined geographic locations or points, determining the expected losses at the predetermined points, calculating an insurance rate for each of the predetermined points, and then interpolating among the insurance rate values established for the predetermined points to determine a rate at the desired location.

Further objects, features, and advantages of the invention will become evident from a consideration of the following detailed description when taken in conjunction with the accompanying drawings and the appended claims.

BRIEF DESCRIPTION OF THE DRAWINGS

For the purpose of facilitating an understanding of the invention there is illustrated in the accompanying drawings a preferred embodiment thereof, from an inspection of which, when considered in connection with the following description, its construction and operation, and many of its advantages should be readily understood and appreciated.

FIG. 6a and FIG. 6b are the first and second pages, respectively, of a table illustrating the method of the present invention.

DETAILED DESCRIPTION OF THE PREFERRED EMBODIMENT

Figure 1:
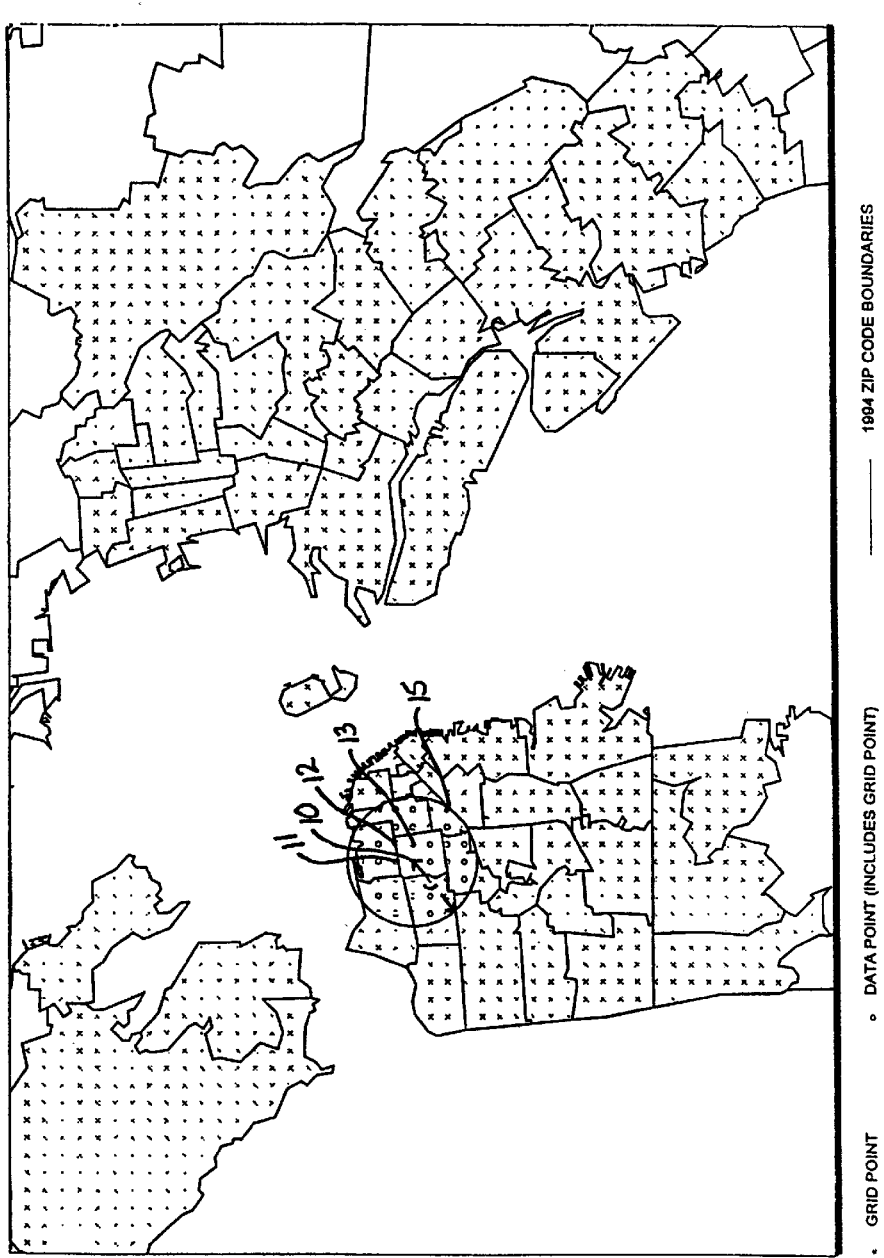
FIG. 1 is a diagram illustrating the method of the present invention.

The first task in the method of the present invention is to select a grid of predetermined points, within a geographic area, at which expected loss information and insurance rates will be calculated. FIG. 1 shows a plurality of grid points. Five of the grid points have been labeled 10, 11, 12, 13 and 15. In a preferred embodiment, the grid points are uniformly spaced within a geographic area. The grid points may be less than a mile apart in an urban geographic area, or several miles apart in a rural geographic area. Since expected losses and rates for points between grid points will be based on interpolation, the distance between grid points will depend upon the expected variation of expected losses by location, and how far apart the grid points may be for interpolation among the grid points to still be reasonable. The distance between grid points, and therefore the number of grid points, will affect the computing resources necessary to carry out the method of the present invention.

The next step in the claimed process is to identify the loss and exposure data to be used in calculating the expected losses for each grid point. In a preferred embodiment of the invention, "geo-coded" loss and exposure data, that is, data that identifies the latitude and longitude associated with prior insured exposures and losses, are utilized. Selection of data for calculation of expected losses for each grid point should be based on criteria that indicate expected similarity to the grid point in terms of expected losses per unit of exposure, such as geographic proximity. For example, the rate for grid point 10 may be calculated using all loss and exposure data within a one and one-half mile radius for grid point 10. In a preferred embodiment, more sophisticated criteria may be used. For example, the radius could be different for different grid points, or a geographic shape other than a circle may be used to define the data sets used for each grid point. Alternately, there may be data from regions relatively far away from a particular grid point that may be considered useful for expected loss calculations for a particular grid point, and there may be data from locations relatively near the grid point that may be considered not useful.

Data for calculation of expected losses for a particular grid point may also be selected from other locations based on criteria other than geographic proximity. For example, it may be decided that population density is a useful criteria for similarity of expected loss per unit of exposure. Data for calculation of expected losses for a particular grid point could be selected based on the combined criteria of geographic proximity and similar population density.

In some cases, natural boundaries, such as a river or a major thoroughfare, must be dealt with in selection of data for a grid point. In those cases, data from an inappropriate region should be excluded.

If geo-coded individual risk data is not available, the process can be used with available loss and exposure data that is summarized by geographic areas, such as zip codes or rating territories. Generally, this can be done by establishing evenly-spaced simulated data locations over the area to be rated, and apportioning the summarized data to the simulated locations. The simulated data may be based upon territorial data, such as territorial losses or rates, or it could be data for zip codes or some other form of geographic subdivision.

The method of the present invention may be refined by varying the weight assigned to prior data selected for each grid point, based upon a relative similarity criteria. For example, if data within a certain radius of a grid point is used, it may be desirable to have data closer to the grid point receive a greater weight than data from further away from the grid point. As shown in FIG. 1, using data within a one and one-half mile radius from grid point 10, data nearest grid point 10, such as data at grid point 10 itself, may be given two and one-half times the weight of data one and one-half miles away, such as data from grid point 15. Data at points between 10 and 15 could be given weights with appropriately varying proportions. Varying weights can also be based on criteria other than distance, such as similarity of population density.

Any known method of weighting data may be used for this method. One such method is to assign a weight which is a fraction having distance from the grid point in the denominator. Such a weight would decrease as distance from the point being rated increases. A general formula for such a weight is $$W = \left(\frac{1}{D+1}\right)^P$$

W in the expression above is the weight assigned to particular loss and exposure data for a particular location. D is the distance from the data point to the grid point being rated. P is an exponent that varies the sensitivity of the weight W, and therefore the calculated rate, to nearby data. If P is near zero, all W's will be close to 1. As P increases, the sensitivity of W to D increases. The quantity +1 in the denominator is present to prevent division by zero in case of a data point having the same location as a grid point. This quantity also prevents an inordinately large weight being given to a data point that is only a very small distance from the grid point.

The quantity D, or the distance between the data point and the grid point, can be calculated in the following manner based on latitude/longitude:

D=3958 miles×Arc Cos [(sin a sin b)+(cos a cos b cos g)]

where a=latitude of the grid point;
b=latitude of the data point; and
g=degrees of longitude between the grid point and the data point.

The distance 3,958 miles represents approximately one radian on the earth's surface.

After weights W are determined for all individual data records, each W is divided by the sum of all W's to provide a relative weight. Thus, the relative weights W will sum to 1, and each relative weight W represents a percentage of the total of the weights W.

This example assumes that there is exactly one exposure unit associated with each data point (e.g., one vehicle per policy). If the number of exposure units varies, then the weights W would be multiplied by the exposure units of each data point, and the resulting product for each data point would be divided by the sum of all such products.

Credibility considerations and procedures for addressing insufficient credibility apply to the subject process of ratemaking for specific geographic locations in the same manner as for ratemaking for geographic territories. "Full credibility" criteria is the volume of historic data necessary for calculated expected losses to have a specified probability of falling within a desired percentage of the true expected loss per unit of exposure. Credibility criteria for expected losses for specific grid points should be the same as those for expected losses for geographic territories, unless an uneven weighting of data based on relative similarity is used. If uneven weighting is used, the full credibility standard should increase by an amount sufficient to result in the same probability of the expected loss falling within the desired percentage of the true expected loss per unit of exposure as if uniform weighting and an associated full credibility standard were used.

If sufficient data for full credibility is not available for a given point or location, an alternate rate indicator may be used for the complement of credibility, as in standard ratemaking procedures. For example, if available data represents 65% credibility, an alternate rate indicator may be used for the 35% complement of credibility. In ratemaking, there are a number of candidates for an alternate rate indicator, including the following:

The expected loss portion of a prior rate for the grid point, trended to current cost level (this is possible only if this ratemaking procedure has been used before).

An expected loss portion of a prior rate for a grid point based upon a territorial rate structure, trended to current cost level.

An indicated expected loss based on a relationship of expected losses to a variable other than location, e.g. population density.

Loss development and trend also apply to the present invention in essentially the same manner as ratemaking for territories. Loss development and trend may be addressed by adjusting the individual risk data appropriately, or by uniformly adjusting the rates for all grid points at the end of the process to produce an aggregate income level consistent with a rate level indication based on standard ratemaking procedures that incorporate development and trend.

As in territorial ratemaking, there may be an interrelationship between location of risks and non-geographic rating factors, such as driver class for automobile casualty insurance or construction class for property insurance. If this is true, then adjustment of the geographic loss and exposure data to offset these factors before calculation of expected losses and rates for the grid points would be appropriate. For example, if a disproportionate number of young drivers are located near a given grid point, the calculated expected losses and rate at that location should be adjusted to exclude the influence of driver age as a geographic factor, or the expected losses and rates for drivers at that grid point will reflect their age both in the geographic factor and in a driver class factor. The procedures that are used to address this issue for territorial ratemaking should also apply to the calculation of expected losses and rates for particular grid points.

After development of expected losses and rates for grid points, and application of credibility procedures, it may be desirable to view a three-dimensional representation and contour charts of a "surface" made of the rates based on expected losses for the grid points. This will illustrate if there is "bumpiness" in the surface due to apparent randomness of underlying claim experience. If credibility procedures have been followed, smoothing this "bumpiness" may not be necessary. If supplemental smoothing of the grid point rates is desired, it may be done by any of a number of known methods. For example, the influence of large claims in the underlying data may be capped, and the expected losses and rates may then be recalculated. Alternatively, the expected losses may be smoothed by running the grid point expected losses themselves through the rate calculation procedure.

After the loss portion of the rates for the predetermined grid points are calculated, anticipated expenses (e.g. commissions, overhead) and profit may be added. In addition, the rate may be adjusted for expected catastrophic losses for coverages that include catastrophe perils. This could be developed from a catastrophe simulation model that develops expected loss rates at individual geographic points, or by using the catastrophe element that is built into an existing territorial rate structure.

After the rates at grid points have been calculated, the rate for any desired location between the grid points may be calculated by interpolation among the values at surrounding grid points. Any known method of interpolating may be used. For example, referring to FIG. 1, assume that a risk with latitude/longitude coordinates (x,y) lies among grid points 10, 11, 12 and 13 with latitude/longitude as shown:

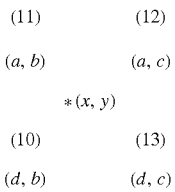

$R_{(x,y)}$ represents the rate to be calculated for the point (x,y), and it is assumed that rates for the four grid points have been determined based on loss and exposure data according to the process described herein. These rates will be denoted as R(a,b), R(a,c), R(d,b), and R(d,c).

An interpolation formula that can be used to calculate a rate for the point (x,y) is $$R_{(x,y)} = R_{(a,b)}\left(\frac{d-x}{d-a}\right)\left(\frac{c-y}{c-b}\right) + R_{(a,c)}\left(\frac{d-x}{d-a}\right)\left(\frac{b-y}{b-c}\right) + R_{(d,b)}\left(\frac{a-x}{a-d}\right)\left(\frac{c-y}{c-b}\right) + R_{(d,c)}\left(\frac{a-x}{a-d}\right)\left(\frac{b-y}{b-c}\right)$$

The formula above can be thought of as a simultaneous two-way linear interpolation. Other methods of interpolating should give similar answers, considering that the rates at the four grid points should not be significantly different.

In implementing new rates, the aggregate premium under the old rates must be compared with the aggregate premium under the new rates to insure that the aggregate income under the new rates is appropriate. Therefore, a method has been devised to determine the overall effect of a rate change upon implementation of a new set of rates for a plurality of grid points. The procedure to do this requires allocating each exposure unit back to adjacent grid points. By the interpolation process, the rate for every risk is a weighted combination of rates from surrounding grid points. The identity of the grid points used for calculating the rate for each risk, the exposure units for the risk, and the weights assigned to each grid point in calculating the rate for the risk can be retained as statistical data. The exposure units can then be assigned back to the grid points and summed to determine a weighting factor representing the net exposure units allocated to each grid point to be used in calculating the effect of a rate change. With exposure units allocated back to the grid points, the effect of a rate change can be calculated as the exposure-weighted average of the changes at the grid points. That is, the effect of a rate change can be calculated by multiplying the rate change at each grid point by the weighting factor based upon its exposure units, then summing the weighted rate changes to determine the aggregate rate change under the new rates.

A Generalized Model of The Present Invention Compared With The Prior Art Territorial Method A Generalized Model Of Determining The Rate At A Predetermined Point A general model for determining rates for predetermined points based on historic claim, exposure, and location data according to the present invention is as follows.

Let the coordinates (x,y) specify the latitude and longitude of the predetermined point. Assume that loss and exposure data are available from N previously recorded insurance contracts, and that there is one unit of exposure for each historic contract. For each contract, the following data is available:

$L_i$ denoting losses incurred for contract i.

$(x,y)_i$ denoting the coordinates for the geographic location of the earned exposure for contract i.

The general model for determining the rate $R_{(x,y)}$ for point (x,y) is then:

$$R_{(x,y)} = \sum_{i=1}^{N} W_{(x,y)i} L_i$$

with $$\sum_{i=1}^{N} W_{(x,y)i} = 1$$

where $W_{(x,y)i}$ is the weight assigned to data from contract i in determining the rate for the point (x,y). Note that the $W_{(x,y)}$ may be different among the various contracts. Also, a different set of weights may be assignable among the recorded contracts for every different (x,y) location being rated.

This general model provides a rate which has not been adjusted for credibility, smoothed or adjusted for catastrophic losses, and which does not include expenses and profits. These adjustments may be made as previously described.

The Traditional Rating Territory Model

In the traditional model, rates are developed based on geographic location by grouping data into mutually exclusive territories. Assuming full credibility, the rate for all points in a territory is based on the total historic losses divided by total historic exposures for all contracts provided in the territory.

By this procedure, the rate $R_{(x,y)}$ may be calculated as:

$$R_{(x,y)} = \frac{\sum_{i=1}^{N_j} L_i}{N_j}$$

where (x,y) is in a territory which will be designated as territory J, $L_i$ denotes losses incurred for contract i, and data is available from $N_J$ historic contracts located in territory J. The expression above can also be written as $$R_{(x,y)} = \sum_{i=1}^{N_j} \left(\frac{1}{N_j}\right) L_i$$

which is equivalent in the general model to defining the weight $W_{(x,y)}$ assigned to data as:

$$W_{(w,y)} = \frac{1}{N_j}$$

for contracts that were in Territory J, and $$W_{(x,y)i} = 0$$

for contracts in other territories. In other words, for contracts located in the territory that (x,y) happens to be in, the weights are equal, and for contracts in other territories the weights are zero. There is no use of data outside of territory J, and no distinction among data points within territory J.

As described above, the rate calculated by either the territorial method or the method of the present invention may be adjusted for credibility. For example, if a territorial rate is the credibility weighted combination of a territory indication and a statewide indication, the calculation for a rate $R_{(x,y)}$ at a point (x,y) in territory J is $$R_{(x,y)} = Z \frac{\sum_{i=1}^{N_j} L_i}{N_j} + (1-Z) \frac{\sum_{i=1}^{N} L_i}{N}$$

which can be written $$R_{(x,y)} = Z \sum_{i=1}^{N_j} \frac{1}{N_j} L_i + (1-Z) \sum_{i=1}^{N} \frac{1}{N} L_i$$

where Z denotes credibility, 1–Z denotes the complement of credibility, $N_j$ denotes the number of historic contracts available in territory J, N denotes the number of historic contracts available in the state, and $L_i$ denotes losses incurred for contract i. The above expression is equivalent to the general model with $W_{(x,y)i}$ equal to a uniform value for contracts within territory J, and another uniform value for contracts outside territory J.

The above discussion provides a framework for comparison of the territorial model to other types of models in considering which might be best for developing rates that accurately estimate expected losses for specific locations. It is apparent that the territorial model is appropriate in situations where there are two uniform degrees of relevancy of data to the point being rated. Also, these two "degrees of relevancy" are independent of the location of a point being rated within a defined territory. This type of rating could be appropriate in a situation where whether or not a point (x,y) belongs within a particular defined territory is the only significant influence on expected losses. This might be the case if a location in a particular political subdivision is the only relevant geographic consideration in determination of expected losses. If the influence of geography on expected losses is more complex than a "two-weight" model allows for, then the generalized model opens the door to other alternatives.

A Specific Example of the Present Invention Compared With the Prior Art Territorial Method As discussed above, if geo-coded individual risk data is not available, one can alternatively use exposure and loss data organized by zip code. Zip code areas generally are a finer geographic breakdown than are most territorial rating structures, and much of the refinement in geographic pricing developed by this procedure can be achieved with zip code data.

An example of use of zip code data is provided here, using Private Passenger Automobile Bodily Injury zip code data for 1991 for the industry obtained from the California Insurance Department. The geographic area for which the example is developed is the San Francisco Bay Area. The example to be developed includes use of the data to determine expected losses per unit of exposure for a company's rating territories, so that the results of territorial ratemaking can be compared to the present invention.

Figure 2:
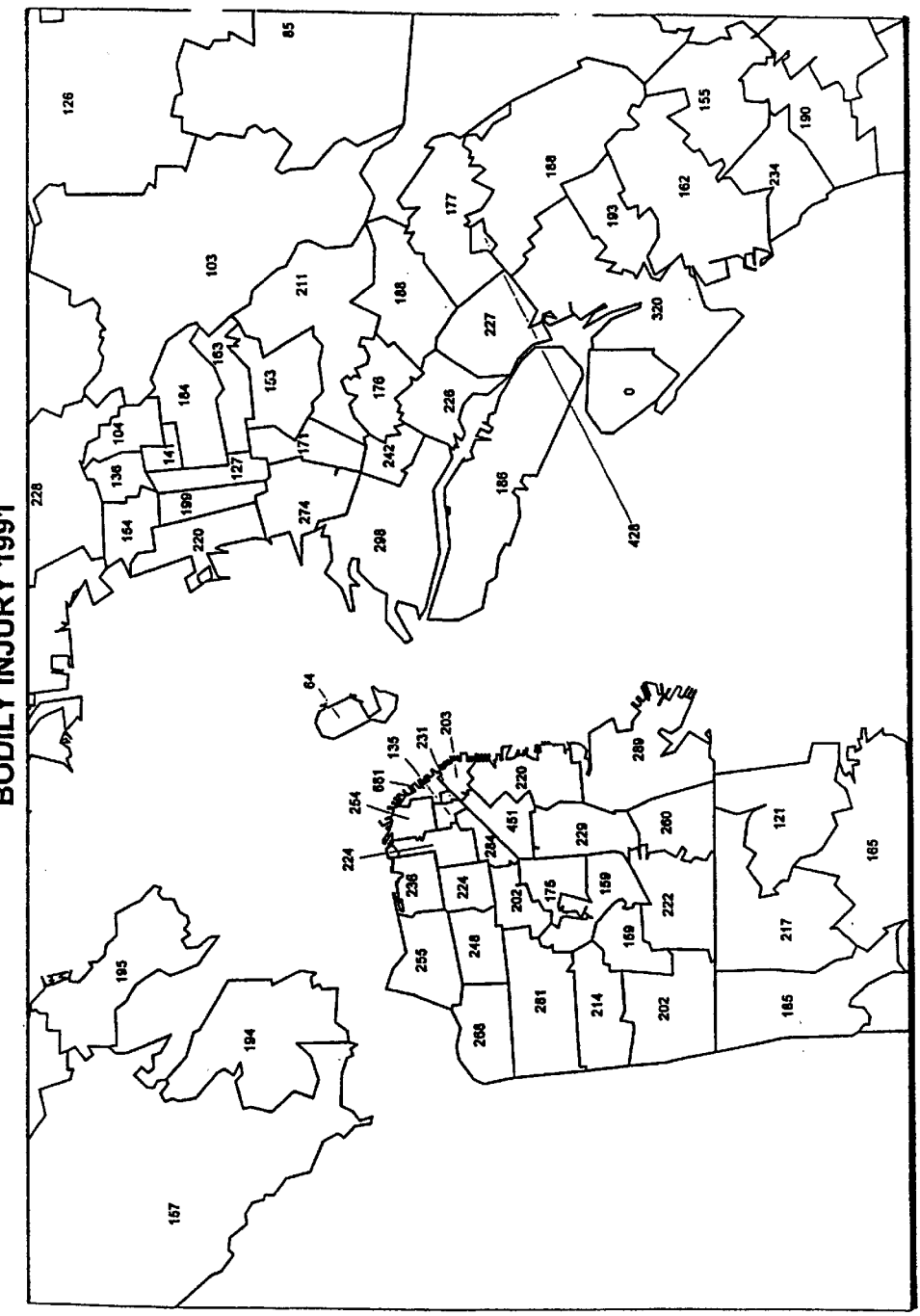
FIG. 2 is a diagram showing exemplary data for use in the method of the present invention.
Figure 3:
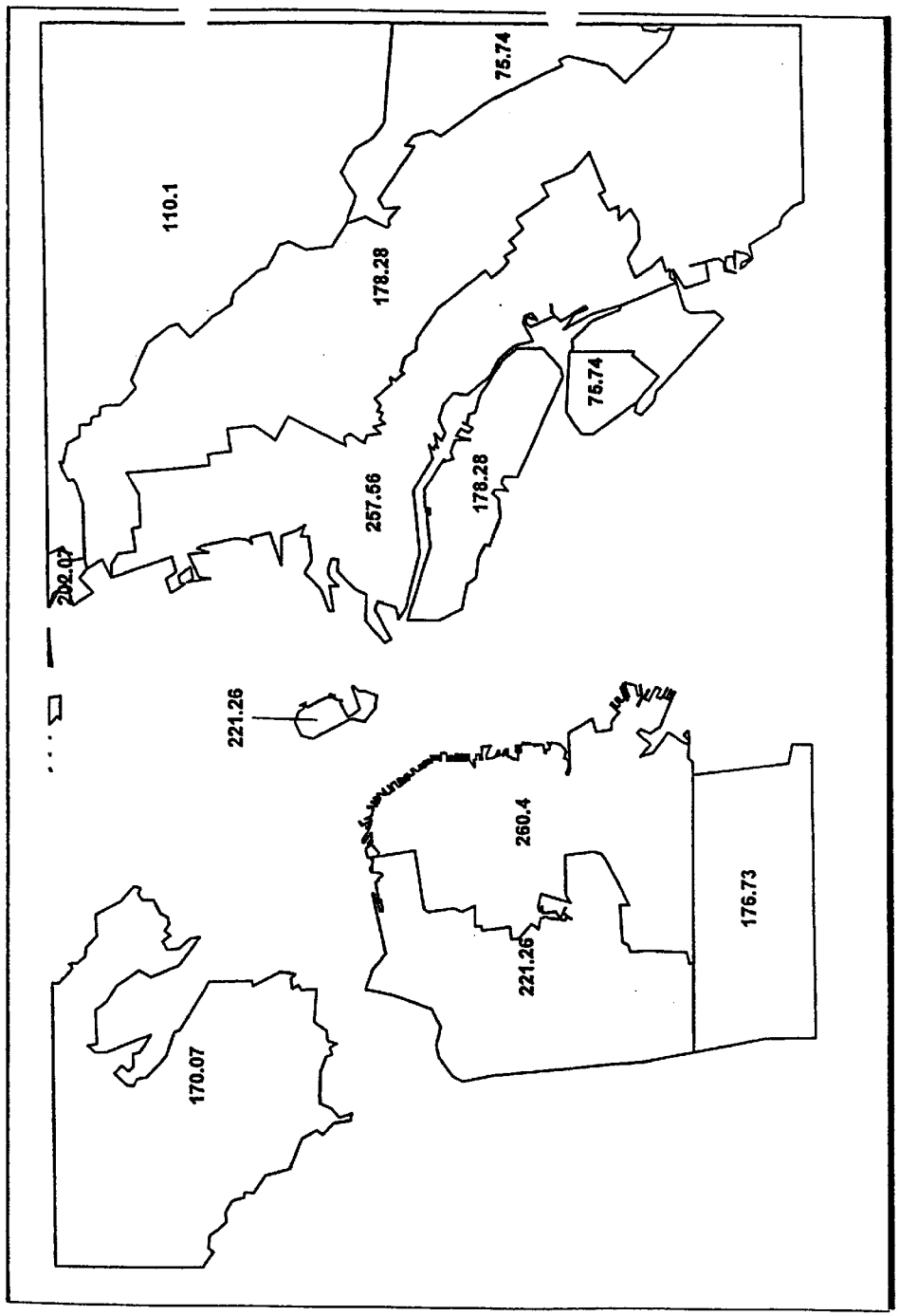
FIG. 3 is a diagram illustrating an insurance rating system known in the prior art.

FIG. 2 is a zip code map of the Bay Area, with the industry pure premiums (that is, the total dollar amount of losses divided by the number of exposure units) by zip code shown on each of the zip code areas. FIG. 3 is a map of average pure premiums for the rating territories of a well known auto insurer, based on this industry data. The pure premium shown on FIG. 3 for each of the territories is an exposure weighted average of the zip code pure premiums shown on FIG. 2, for the zip codes within each territory.

Figure 4:
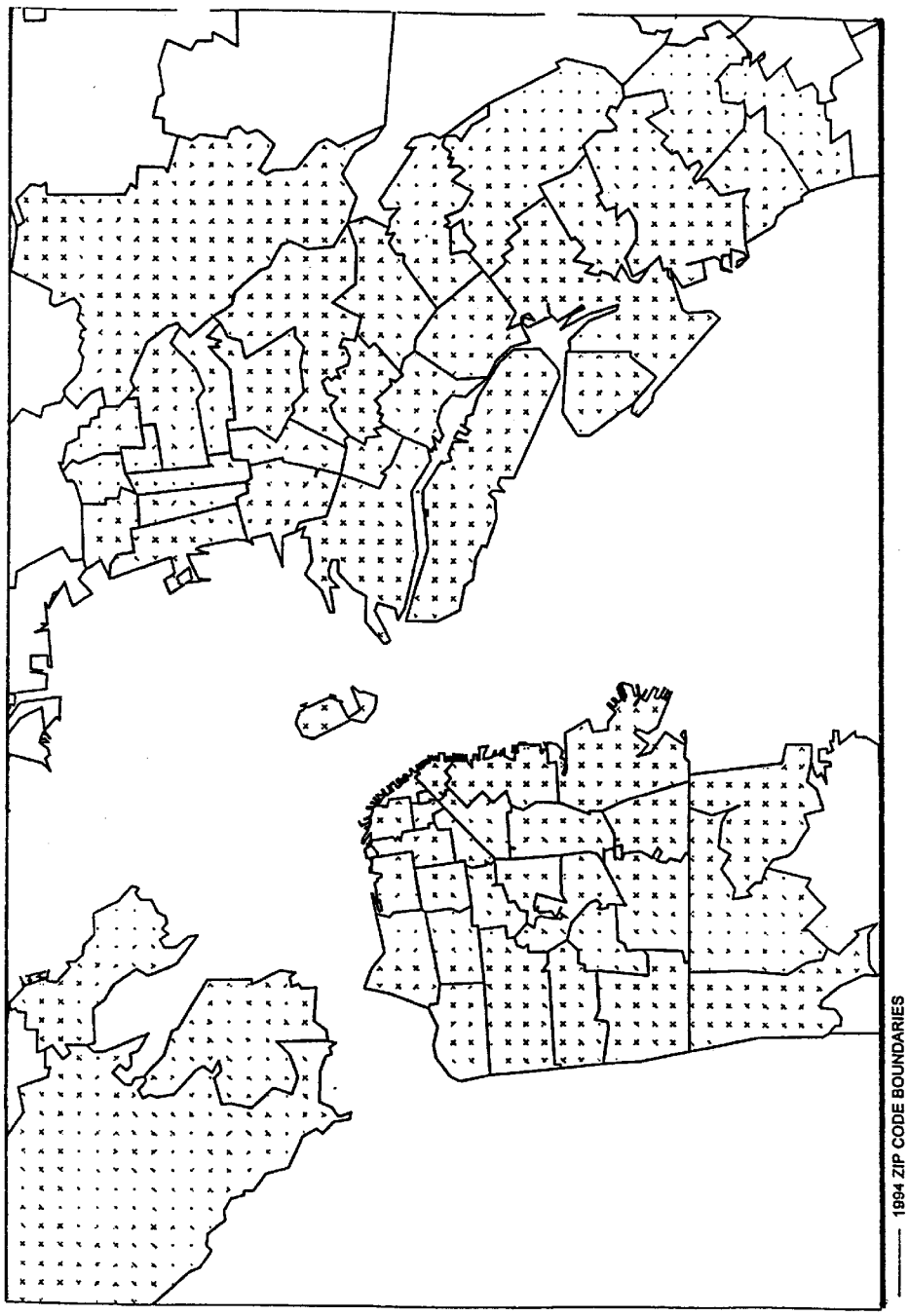
FIG. 4 is a diagram illustrating the method of the present invention.

FIG. 4 illustrates the first step in the method of the present invention, which is to determine the "grid points" for which expected losses will be determined. For this example, the intervals between grid points are four-tenths of a mile each. FIG. 4 shows the grid points over zip code boundaries. For this example, each grid point is assumed to be a location of historic loss and exposure data as well as a point for which an expected loss will be determined. For each assumed data location, an observed pure premium is assigned equal to the pure premium of the zip code area that the grid point is within. A number of exposure units equal to the total exposure units for the zip code that the data point is within, divided by the number of data points in the zip code, is also assigned to each assumed data location. In the next step, a radius around each grid point is determined. Historic loss and exposure data within this radius is used to calculate expected losses for each grid point. For this example, a radius of one and one-half miles was used. The weighting formula based on distance described earlier was also used, with a P value (exponent) of 1.0.

Figure 5:
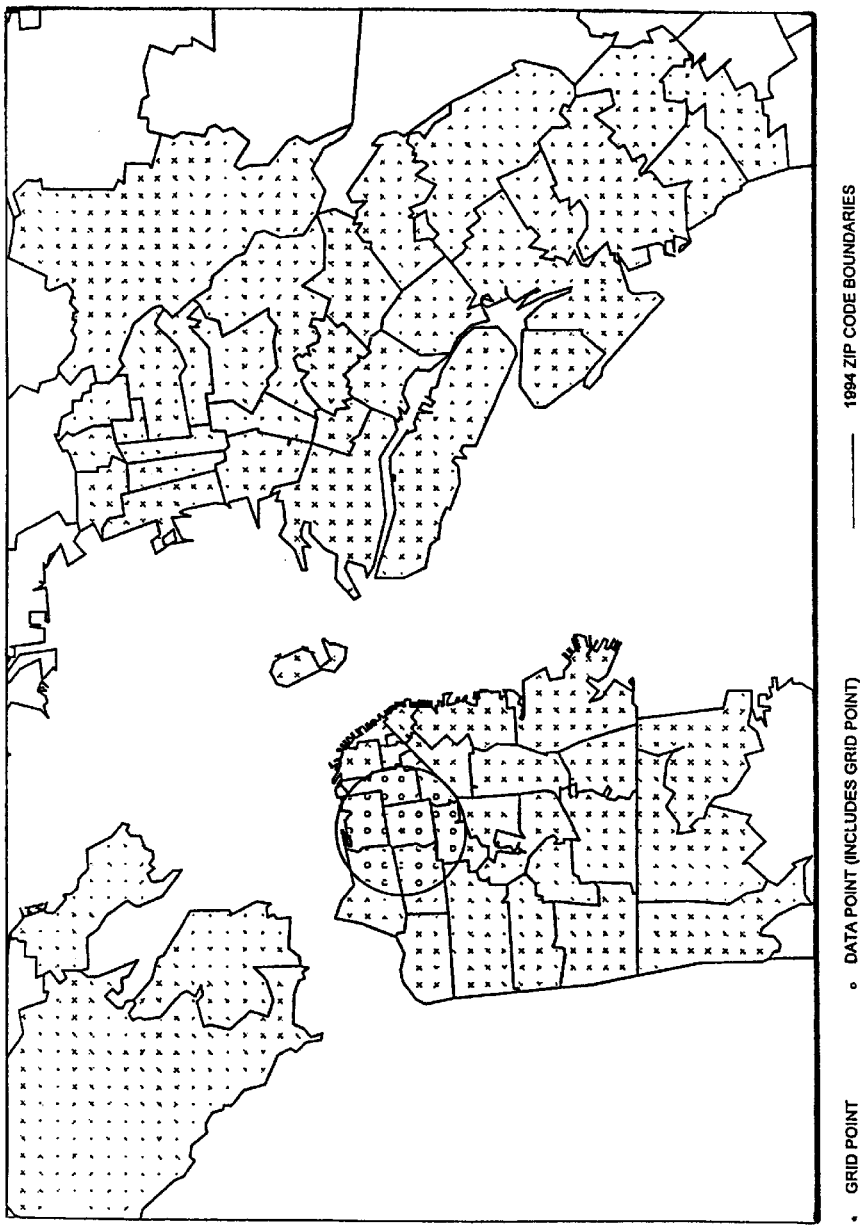
FIG. 5 is a diagram illustrating the method of the present invention.

FIG. 5 is an illustration of one grid point, (at the longitude, latitude shown on the drawing) and the simulated data points around it that are used to determine expected losses for that grid point. A similar illustration would apply for all other grid points in this example.

FIG. 6 details the calculations of the expected losses for the grid point illustrated on FIG. 5. All assumed data locations that are used to calculate the expected losses for the grid point are listed, with their distances from the grid point and weights based on distance and exposure. The total in Column (8) is the expected losses for the grid point. Expected losses for all other grid points are similarly calculated.

Figure 7:
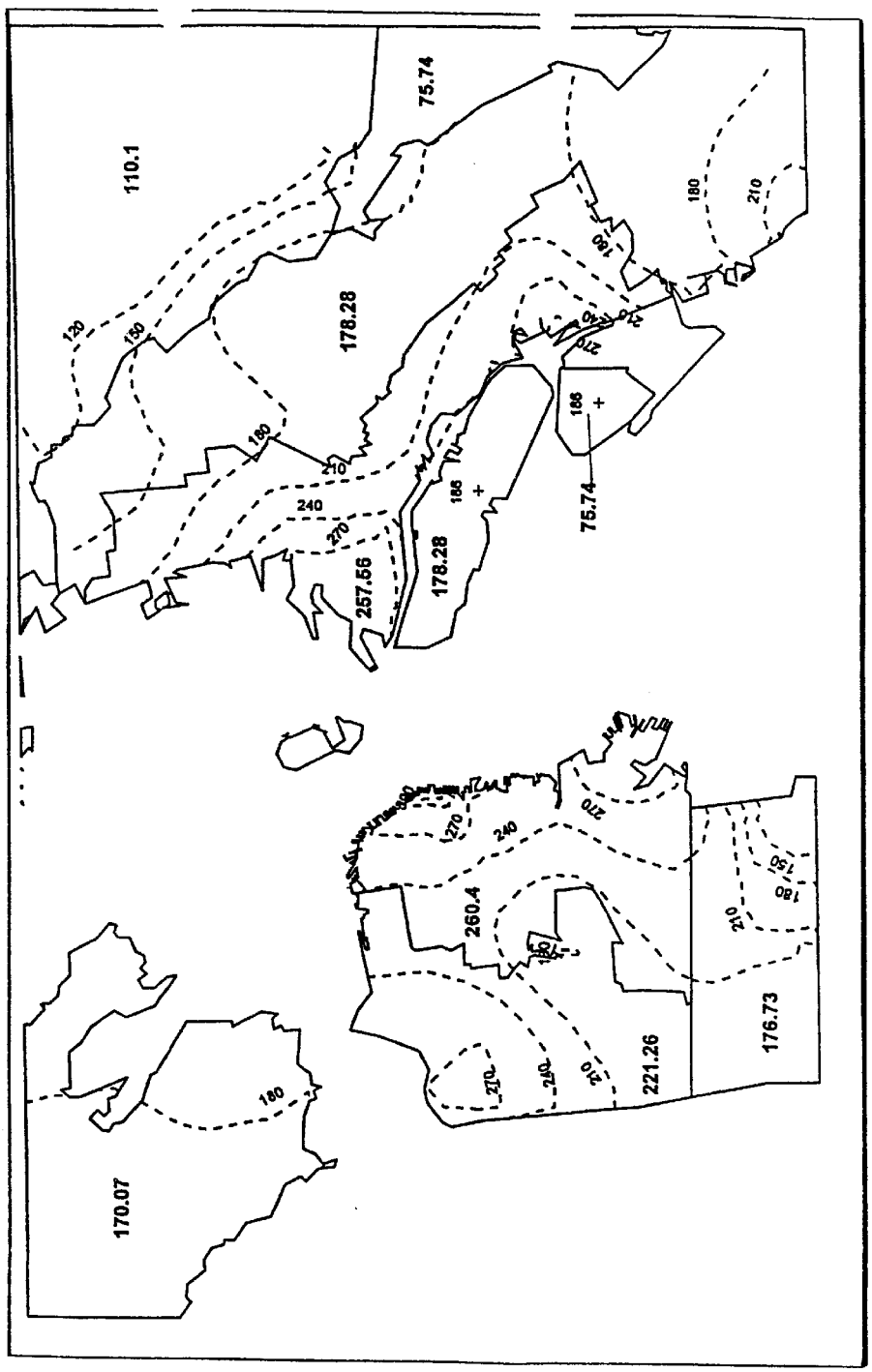
FIG. 7 is a diagram illustrating the method of the present invention.

FIG. 7 is a contour chart showing the expected losses surface that results from the expected losses calculated for every grid point as illustrated on FIG. 6. The expected losses for points in between the grid points are based on interpolation. FIG. 7 also shows the territorial expected losses shown on FIG. 3. The territorial expected losses may be compared to the surface contours, with regard to which is higher or lower, and with regard to how the expected losses vary by location.

It may be noted that the one and one-half mile radius used for this example was chosen in recognition that the example area is densely populated, and that substantial variation of cost by location may occur. As to credibility, use of more than one year of data would be appropriate for an actual application. Also, credibility procedures can be used as discussed above. To illustrate the volume of data used for a grid point in this example, it is estimated that 946 claims were within the circle shown around the grid point in FIG. 5. For the zip codes that are only partially within this circle, this estimate includes a proportion of the total claims in each zip code equal to the proportion of data points of the zip code within the circle.

This example also illustrates the use of a natural boundary in creation of the pure premium surface. Alameda Island, which lies near Oakland in the East Bay, is isolated from the nearby mainland in a manner that could be expected to develop a distinct difference in expected losses. This island has its own zip code, and only data from that zip code was used to calculate expected losses for the grid points on this island. Also, data from this zip code was excluded from use in calculating any expected losses for grid points on the mainland. An area known as "Bay Farm Island" lies just below Alameda Island. For the purpose of this example, the same historic pure premium was used for Bay Farm Island and Alameda Island, instead of the zero shown on FIG. 2. Also, expected loss contours over the area of the Oakland airport were eliminated.

The invention has been described above in an illustrative manner and it is to be understood that terminology which has been used is intended to be in the nature of description rather than of limitation. Obviously many modifications and variations of the present invention are possible in light of the above teachings. It is therefore to be understood that within the scope of the appended claims, the invention may be practiced otherwise than as specifically described.

What is claimed is:

1. A method that utilizes and transforms historic insurance data such as losses, policyholder location, coverage provided, and other factors affecting likelihood of loss into a three dimensional surface over a map that provides a uniquely estimated rate value for every location desired, comprising the steps of:

selecting a plurality of predetermined points such that every location for which rate values are desired is located at or among the predetermined points;

determining a rate value for each predetermined point by using data uniquely selected and weighted from other locations;

interpolating among the rate values at the predetermined points to determine the rate values at desired locations which are located among the predetermined points; and specifying the rate values calculated at the predetermined points and, by formula, the rate values at desired locations among the predetermined points to create a three dimensional surface over a map that provides a uniquely estimated rate value for every location desired.

2. The method of claim 1, wherein the plurality of predetermined points are uniformly spaced from each other.

3. The method of claim 1, wherein the step of calculating the rate values at each predetermined point comprises the step of identifying relevant information affecting the likelihood of loss.

4. The method of claim 3, wherein the step of calculating the rate values at each predetermined point further comprises the step of assigning relative weights to the historic insurance data.

5. The method of claim 4, further comprising the step of adjusting the rate values at each predetermined point to reflect actuarial credibility.

6. The method of claim 1, further comprising the step of adjusting the rate values at each predetermined point to reflect actuarial credibility.

7. A method that transforms historic insurance data such as losses, policyholder location, coverage provided, and other factors affecting likelihood of loss into rate values for creating a three dimensional rating surface of uniquely estimated rate values for all locations desired comprising the steps of:

selecting a plurality of predetermined points such that all locations for which rate values are desired are located at or among the predetermined points;

determining a rate value for each predetermined point by using data uniquely selected and weighted from other locations;

interpolating among the rate values at the predetermined points to determine the rate values at desired locations which are located among the predetermined points;

transforming the rate values calculated onto a contour of point sets; and plotting the contour point sets to formulate a three dimensional rating surface of uniquely estimated rate values for all locations desired.

8. The method of claim 7, wherein the plurality of predetermined points are uniformly spaced from each other.

9. The method of claim 7, wherein the step of calculating the rate values at each predetermined point comprises the step of identifying relevant information affecting the likelihood of loss.

10. The method of claim 9, wherein the step of calculating the rate values at each predetermined point further comprises the step of assigning relative weights to the historic insurance data.

11. The method of claim 9, further comprising the step of adjusting the rate values at each predetermined point to reflect actuarial credibility.

12. The method of claim 7 further comprising the step of adjusting the rate values at each predetermined point to reflect actuarial credibility.

* * * * *